United States Patent [19]

Chesnoy et al.

[11] Patent Number: 5,768,454
[45] Date of Patent: Jun. 16, 1998

[54] METHOD OF AND SYSTEM FOR WRITING A BRAGG GRATING POINT BY POINT BY POINT IN AN OPTICAL FIBER

[75] Inventors: José Chesnoy, Paris; Pierre Sansonetti; Isabelle Riant, both of Palaiseau, all of France

[73] Assignee: Alcatel Alsthom Compagnie Generale d'Electricite, Paris Cedex, France

[21] Appl. No.: 772,514

[22] Filed: Dec. 24, 1996

[30] Foreign Application Priority Data

Dec. 26, 1995 [FR] France .................. 95 15491

[51] Int. Cl.$^6$ .................................................. G02B 6/34
[52] U.S. Cl. .................. 385/37; 385/10; 385/28; 385/33; 359/563; 359/569
[58] Field of Search ............... 385/37, 10, 27, 385/28, 33, 123; 359/563, 569, 573

[56] References Cited

U.S. PATENT DOCUMENTS

| | | | |
|---|---|---|---|
| 5,104,209 | 4/1992 | Hill et al. | 385/27 |
| 5,367,588 | 11/1994 | Hill et al. | 385/37 |
| 5,550,654 | 8/1996 | Erdogan et al. | 385/10 X |
| 5,604,829 | 2/1997 | Bruesselbach | 385/37 |

FOREIGN PATENT DOCUMENTS

| | | |
|---|---|---|
| 0560511A2 | 9/1993 | European Pat. Off. |
| 0606726A2 | 7/1994 | European Pat. Off. |
| 2272075 | 5/1994 | United Kingdom. |

OTHER PUBLICATIONS

D. Z. Anderson et al, "Production of in–Fibre Gratings Using a Diffractive Optical Element", *Electronics Letters*, vol. 29, No. 6, Mar. 18, 1993, pp. 566–568.

N. H. Rizvi et al, "Excimer laser writing of submicrometer period Bragg gratings using phase-shifting mask projection", *Electronics Letters*, vol. 31, No. 11, 25 May 1995, pp. 901–902.

J. Martin et al, "Novel writing technique of long and highly reflective in–fibre gratings", *Electronics Letters*, vol. 30, No. 10 May 12, 1994.

*Primary Examiner*—Phan T. H. Palmer
*Attorney, Agent, or Firm*—Sughrue, Mion, Zinn, Macpeak & Seas, PLLC

[57] ABSTRACT

A system for writing a Bragg grating point-by-point in an optical waveguide includes an illumination system for producing a primary beam. It further includes a diffraction grating to receive the primary beam and to produce a zero order secondary beam and two symmetrical secondary beams of higher order and a focusing optical device for focusing the secondary beams onto a writing area of the waveguide. The diffraction grating and the focusing optical device define an intensity function of writing in the area of the guide including a central peak and two secondary peaks spaced from the central peak by a distance equal to the pitch of the grating.

9 Claims, 2 Drawing Sheets

METHOD OF AND SYSTEM FOR WRITING A BRAGG GRATING POINT BY POINT BY POINT IN AN OPTICAL FIBER

BACKGROUND OF THE INVENTION

1. Field of the invention

The present invention is generally concerned with Bragg gratings, or photorefractive gratings, written optically in optical fibers. The invention is more precisely concerned with the writing of these gratings point-by-point.

2. Description of the prior art

The writing of a Bragg grating in an optical fiber relies on the fundamental principle of varying the refractive index of the core of the fiber by U.V. illumination as described in American patent U.S. Pat. No. 4,474,427. In the prior art, a holographic technique discussed in document U.S. Pat. No. 4,725,110 or a point-by-point technique described in patent U.S. Pat. No. 5,104,209 or a phase mask technique disclosed in U.S. Pat. No. 5,367,588 is used to write the grating. This latter technique uses a phase mask illuminated by an incident beam and located in the immediate vicinity of the fiber. Interference occurs in the plane of the fiber between the order 1 and order −1 beams diffracted by the mask.

The document "Point-by-point fabrication of micro-Bragg gratings in photosensitive fibre using single excimer pulse refractive index modification techniques" by B. MALO et al. published in ELECTRONICS LETTERS, 2 Sep. 1993, vol. 29, No 18 describes a technique for writing a Bragg grating point-by-point. Each point is the image of a slot that is focused by a lens to delimit a laser beam spot. The period required of the grating for it to reflect light at the first order for the wavelength of 1 558 nm is 533 nm. It is in practise impossible to write a first order Bragg grating using the solution described in the above document.

The present invention aims to remedy the above drawback by providing a system for and a method of writing a Bragg grating point-by-point into an optical fiber, the grating being written to the first order.

SUMMARY OF THE INVENTION

To this end, a system for writing a Bragg grating point-by-point in an optical waveguide, including illumination means for producing a primary beam comprises a diffraction grating for receiving said primary beam and producing a 0 order secondary beam and two symmetrical higher order secondary beams and a focusing optical member for focusing said secondary beams onto an area of writing of said waveguide, said diffraction grating and said focusing optical member defining an intensity function of writing in said area of the waveguide comprising a central peak and two secondary peaks each spaced from the central peak by a distance equal to the pitch of said grating.

The diffraction grating is preferably a phase mask.

To reduce the size of the optics, the phase-mask and the optical focusing member may be combined in the form of a single diffractive optic.

In one advantageous embodiment, the amplitude of each of the secondary peaks is substantially half the amplitude of the central peak.

To write the Bragg grating over an extended length, the system of the invention includes means for displacing the waveguide relative to said diffraction array and said optical focusing member.

In one embodiment, the displacement means are in the form of a piezo-electric device.

The displacement means are controlled by interferometric detection means to write a next area, for example.

In the method of writing a Bragg grating point-by-point in an optical waveguide a primary light beam is formed, said primary light beam is separated into at lest one 0 order secondary light beam and two higher order symmetrical secondary beams, and said secondary beams are focused onto a writing area of said waveguide, to define an intensity function having a central peak and two secondary peaks each spaced from the central peak by a distance equal to the pitch of said grating.

The guide is displaced relative to the spot of the intensity function to write each point of the grating.

Other features and advantages of the present invention will emerge clearly from a reading of the following description with reference to the corresponding accompanying drawings.

DETAILED DESCRIPTION OF THE PREFERRED EMBODIMENT

Figure 1:
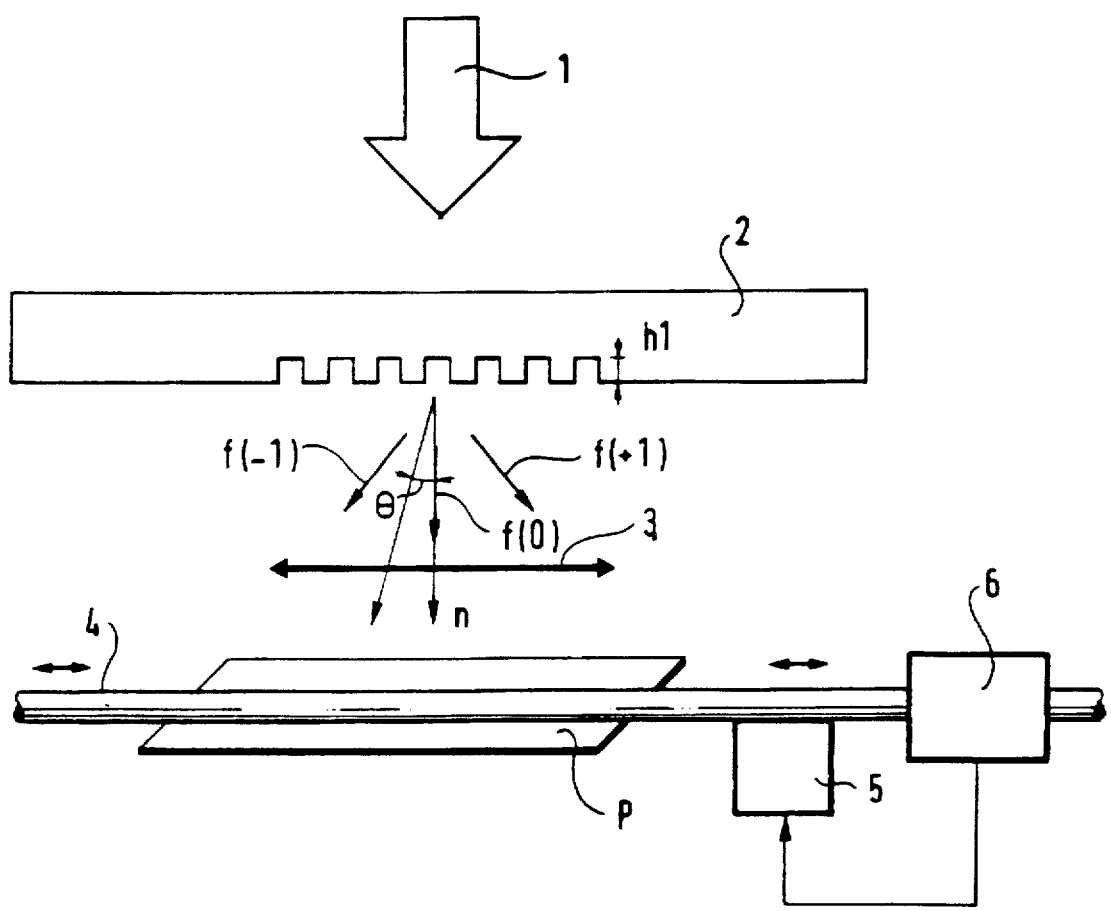
FIG. 1 shows a system of the invention for writing a Bragg grating point-by-point in an optical fiber.
Figure 2:
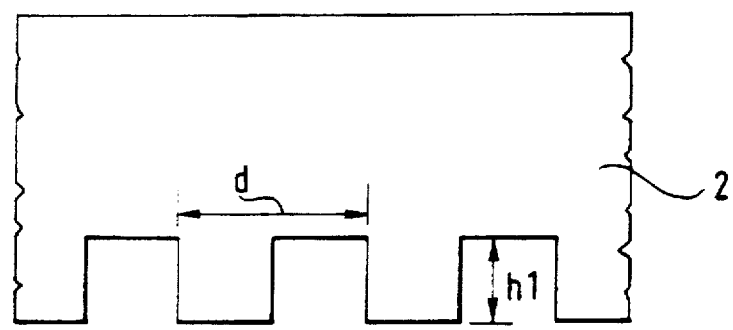
FIG. 2 shows in longitudinal section a portion of a diffraction grating of the system from FIG. 1.

Referring to FIG. 1, a system in accordance with the invention for writing a Bragg grating point-by-point in an optical fiber includes a diffraction grating 2 and a focusing lens 3. A primary light beam 1 produced by a laser source, typically by a KrF laser at the wavelength $\lambda=249$ nm, illuminates an optical fiber 4 through the diffraction grating 2 and the focusing lens 3 in succession. The diffraction grating 2 is in the form of a phase mask having a squarewave periodic surface pattern defining successive teeth over a portion of given length, for example. As shown in FIG. 2, the surface pattern has a period d comprising one trough and one crest, the latter forming the tooth. A diffraction grating of this kind produces diffracted beams of different orders, including a secondary beam of order 0, denoted f(0), and two symmetrical secondary beams of higher order 1 and −1, denoted f(1) and f(−1). These secondary beams are projected onto the focusing lens 3 which in response produces a unit pattern of the process of writing a Bragg grating in an area of the optical fiber 4.

The following equation is well known in the field of diffraction gratings:

$$d(\sin i - \sin \theta) = m\lambda$$

where d is the period of the diffraction grating 2, i is the angle of incidence of the primary beam, $\theta$ is the angle of diffraction of the diffracted secondary beam concerned, m is the order of the diffracted secondary beam and $\lambda$ is the wavelength of the primary beam.

In the FIG. 1 embodiment the angle i is such that $\sin(i)=0$. The 0 order beam f(0) is such that $i=(\theta)$ and is therefore diffracted along the normal n to the phase mask 2. The two beams respectively of order 1 and (−1) are such that:

$$d.\sin(\theta)=\pm\lambda$$

that is:

$$\sin(\theta)=\pm\lambda/d \quad (1)$$

Figure 3:
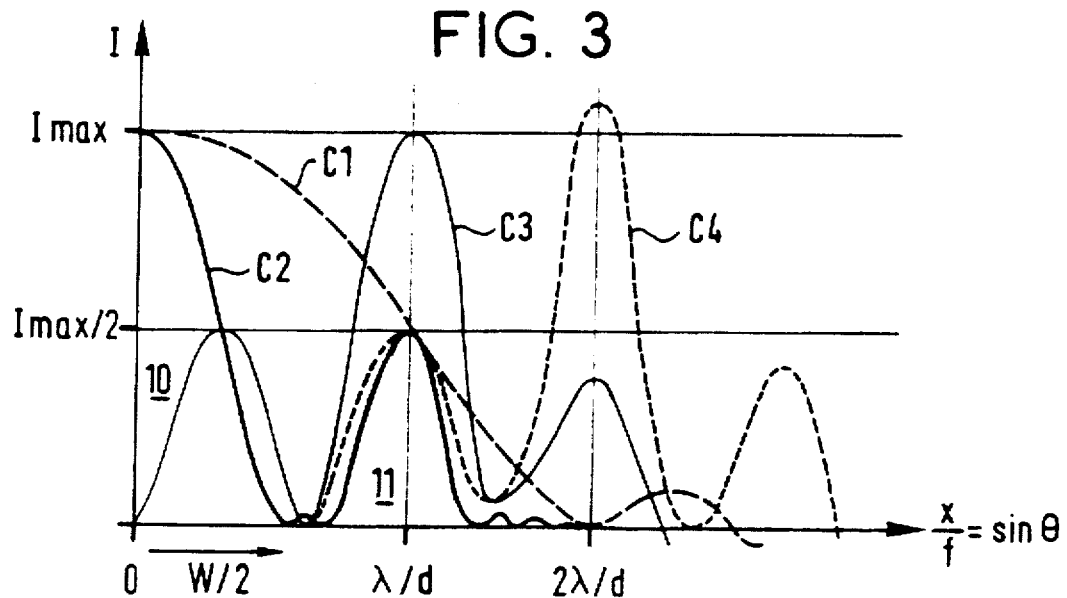
FIG. 3 shows the luminous intensity function produced by a combination of a diffraction grating and a focusing lens in the system from FIG. 1.

As a result of the lens 3 focusing the primary beam f(0) and the secondary beams f(1) and f(−1) produced by the diffraction grating 2, there is obtained in the area in which the fiber is written an intensity function I of the type shown by the curve C2 in FIG. 3. The intensity curve C2, only half of which is shown, includes a central peak 10 and two secondary peaks 11 resulting respectively from the 0 order secondary beam and the 1 and (−1) order secondary beams. The curve C2 is contained within an envelope C1.

Figure 4:
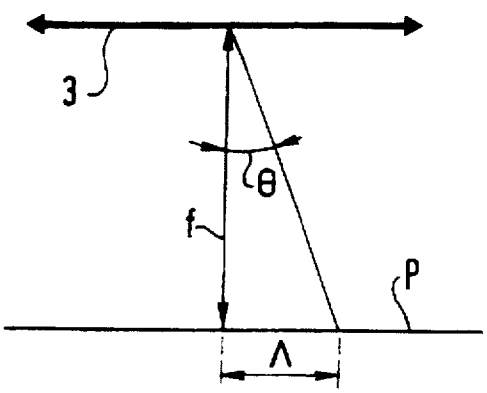
FIG. 4 is a representation of a projection in the focal plane of an image received by the focusing lens.

As shown in FIG. 4, in the focal plane P of the lens 3, the pitch $\Lambda$ of the grating to be written in the optical fiber 4 is given geometrically by:

$$\Lambda=\sin(\theta).f$$

that is:

$$\sin(\theta)=\Lambda/f \quad (2)$$

By comparing equations (1) and (2) we obtain:

$$\lambda/d=\Lambda/f$$

that is:

$$d=(f.\lambda)/\Lambda \quad (3)$$

The dimension of the focusing spot w of the 0 order beam, denoted 10, must be equal to the pitch $\Lambda$ of the Bragg grating to be written in the fiber 4.

For a lens with a focal length f and aperture number f#=f/D, where D is the diameter of the beam, the dimension w of the spot is given by:

$$w=2.\lambda.f\#$$

The following equation must therefore be satisfied:

$$2.\lambda.f\#=\Lambda \quad (4)$$

In one embodiment in which a 1 558 nm Bragg grating is required, the pitch $\Lambda$ of the Bragg grating must be equal to 533 nm for it to reflect the light to the first order. The primary light beam 1 typically has a wavelength $\lambda$=249 nm. For this embodiment, equation (4) gives:

$$2.(249).f\#=533$$

that is:

$$f\#=1$$

which amounts to the statement f=D.

From equation (3) which states that $d=(f.\lambda)/\Lambda$, and knowing that the pitch $\Lambda$ of the grating to be written is equal to 2.$\lambda$ in the selected embodiment, we obtain d=(f/2)=(D/2).

With a primary beam diameter equal to 25 mm, the squarewave surface pattern of the diffraction grating 2 has a length D equal to 25 mm. Given that d=(D/2), the period D of the surface pattern is equal to 12.5 mm. The surface pattern of the diffraction grating 2 therefore includes two periods. The focal length f of the lens 3 is also 25 mm.

Figure 5:
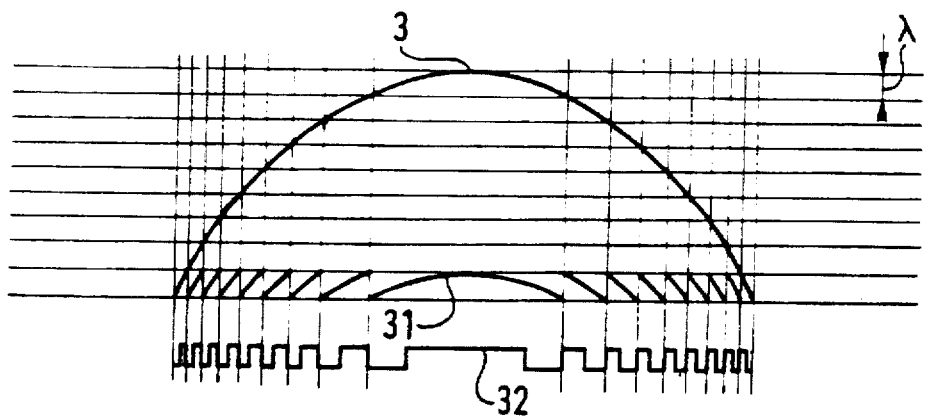
FIG. 5 shows the transformation of the focusing lens into the form of a diffractive optic.

As shown in FIG. 5, a convergent focusing lens 3 is substantially equivalent to a Fresnel lens 31 with "sawteeth" etched to a given depth. This is because any variation in the height of the lens inducing a path length difference that is a multiple of $\lambda$ for the received wave can be ignored. The Fresnel lens can be approximated by an optic with a crenellated surface pattern 32. Each "sawtooth" of the Fresnel lens 31 is approximated by a crest and a trough respectively corresponding to the top and bottom parts of the sawtooth. A wave portion received through a crest will be phase-shifted by $\pi$ relative to a wave portion received through a trough.

Each tooth, or crest, of the diffraction grating has a height h=h1 associated with a phase-shift of $\pi/2$ relative to a trough. The phase-shift can in practise be different from $\pi/2$, which modifies the relative amplitude I between the main peak 10 and secondary peaks 11. In parallel with this, each tooth of the approximate focusing lens 32 has a height h'=h2 associated with a phase-shift of $\pi$ relative to a trough.

In accordance with the invention, it is envisaged that the phase mask 2 and the approximate focusing optic lens 32 be combined so as to use a single diffractive optic. To achieve this, a phase mask and the approximate focusing lens are "superposed". The surface of the single diffractive optic is etched so that at each point the tooth height is equal to the sum of the respective tooth heights of the diffraction grating 2 and of the approximate focusing lens 32 for the point concerned. Thus teeth with heights h1, h2 and (h1+h2) may co-exist in the single diffractive optic. Alternatively, the single diffractive optic may be obtained by etching a structure corresponding to the required response of the diffraction grating/lens combination.

Referring to FIG. 3, the intensity function I for writing an area in the focal plane of the lens 3 includes a central peak 10 and two secondary peaks 11.

Two variants may be envisaged for writing the various successive areas to form the grating. In a first variant, after writing one area, the next area is written after displacing the fiber 4 relative to said diffraction grating 2 and said focusing obstacle member 3 so that for the next area the central peak is located at the same place as a secondary peak of the preceding area, as shown by the dashed curve C3 in FIG. 3. In a second variant, after writing one area, the next area is written after displacing the fiber 4 relative to said diffraction grating 2 and said focusing obstacle member 3 by twice the displacement of the first variant. Thus, for the next area, the secondary peak is located at the same place as a secondary peak of the preceding area, as shown by the curve C4 in FIG. 3. In this second variant, the amplitude of each of the two secondary peaks 11 must be substantially equal to half the amplitude of the central peak 10. In practise this condition is met by having each tooth, or crest, of the diffraction grating 2 have a height h=h1 associated with a phase-shift of $\pi/2$ relative to a trough.

Referring to FIG. 1, the displacement of the fiber relative to the diffraction grating 2 and the focusing optical member 3 is obtained by means of a device 5 such as a piezo-electric device, for example. An interferometric optical detector device 6 may be used in the plane of the fiber 4. The detector device 6 measures the displacement of the fiber in translation. The displacement device 5 is controlled accordingly by the optical device 6 to write a next area of the Bragg grating.

The system described offers the possibility of writing short gratings, typically shorter than 100 μm. Furthermore, in accordance with the invention, the distance between the secondary peaks 11 and the central peaks 10 can be modified using a primary beam 1 that is either convergent or divergent, in a technique described in French patent application No 94 15132, hereby incorporated by way of reference. This solution is beneficial in that it can be used to vary the pitch of the grating.

There is claimed:

1. A system for writing a Bragg grating point-by-point in an optical waveguide, including illumination means for producing a primary beam, a diffraction grating for receiving said primary beam and producing a 0 order secondary beam and two symmetrical higher order secondary beams and a focusing optical member for focusing said secondary beams onto an area of writing of said waveguide, said diffraction grating and said focusing optical member defining an intensity function of writing in said area of said waveguide comprising a central peak and two secondary peaks each spaced from said central peak by a distance equal to the pitch of said grating.

2. The system claimed in claim 1 wherein said diffraction grating is a phase mask.

3. The system claimed in claim 2 wherein said phase mask and said focusing optical member are combined in the form of a single diffractive optic.

4. The system claimed in claim 1 wherein the amplitude of each of said secondary peaks is substantially half the amplitude of said central peak.

5. A system as claimed in claim 1 further comprising means for displacing said guide relative to said diffraction grating and said focusing optical member.

6. The system claimed in claim 5 wherein said displacement means are in the form of a piezo-electric device.

7. The system claimed in claim 5 wherein said displacement means are controlled by interferometric detector means to write a next area.

8. A method of writing a Bragg grating point-by-point in an optical waveguide wherein a primary light beam is formed, said primary light beam is separated into at least one 0 order secondary light beam and two higher order symmetrical secondary beams, and said secondary beams are focused onto a writing area of said waveguide, to define an intensity function having a central peak and two secondary peaks each spaced from said central peak by a distance equal to the pitch of said grating.

9. The method claimed in claim 8 wherein said guide is displaced relative to the spot of said intensity function to write each point of said grating.

* * * * *